J. S. Smith,
Spring Hinge.
No. 2,725.
Reissued Aug. 6, 1867.
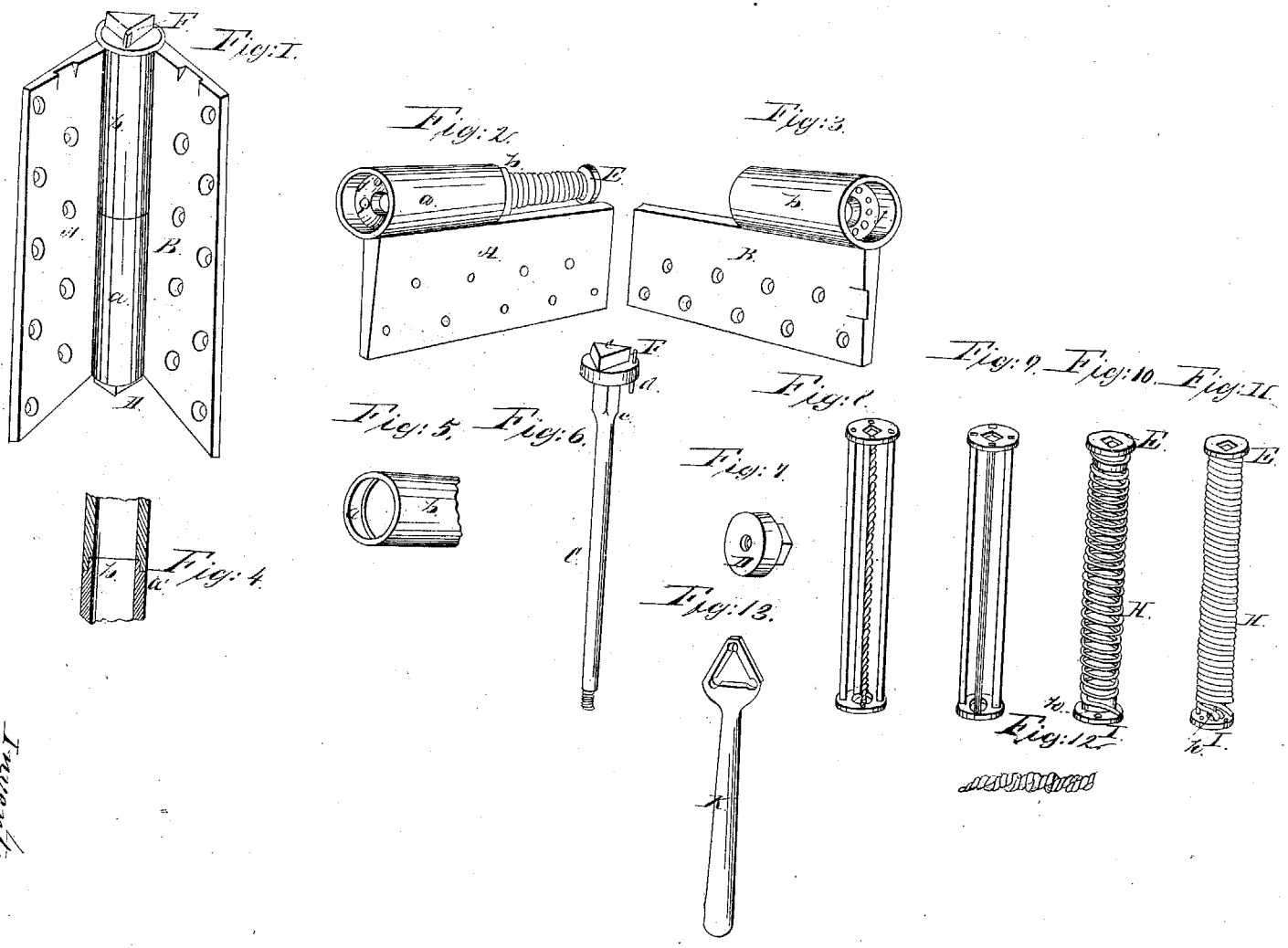
Inventor:
C. E. Stanley
Assignee of
Dr. J. S. Smith.
by Munn & Co.
Attys
N. PETERS, PHOTO-LITHOGRAPHER, WASHINGTON, D. C.

United States Patent Office.

CHARLES E. STANLEY, OF CLEVELAND, OHIO, ASSIGNEE OF DOCTOR JOSEPH SHERBOURNE SMITH.

*Letters Patent No.* 17,354, *dated May* 19, 1857; *antedated May* 12, 1857; *reissue No.* 2,725, *dated August* 6, 1867.

SPRING-HINGE.

The Schedule referred to in these Letters Patent and making part of the same.

TO ALL WHOM IT MAY CONCERN:

Specification of an improved Spring-Hinge, invented by Doctor JOSEPH SHERBOURNE SMITH, of the city, county, and State of New York.

I am aware that the opening and closing of doors, gates, &c., by means of springs, operating in combination with hollow-jointed hinges, have been used, but which have been so devised that the degree of the torsion or adjustment of the springs combined therewith could not be practically regulated after the hinges are in position for operation.

The distinction between the invention herein described and the aforesaid hinges consists in combining with a hollow-jointed hinge and spring an adjusting device, by means of which, after the hinge is finished and placed upon the door, or other article hinged, and when in position for use, the degree of tension or torsion of the spring within the said hollow-joint can be so adjusted as to adapt it to perform the service required, as hereinafter more fully set forth, reference being had to the accompanying drawings, making a part of this specification, in which—

Figure 1 is a perspective view of the hinge complete, and represented as partially open.

Figure 2 is a perspective view of one of the leaves or wings of the hinge, with the lower part of the joint or knuckle, which is cast or otherwise made with and forms a part of it, and also showing the spring contained therein.

Figure 3 is a perspective view of the other wing of the hinge, with the upper part of the joint.

Figure 4 is a vertical central section of a part of the joint of the hinge, showing the construction of the hollow-joint of the two parts of the hinge at the point where they unite with each other.

Figure 5 is a perspective view of a part of the upper portion of said hollow-joint, showing the manner in which it is formed to receive the other portion of the said joint.

Figure 6 is a perspective view of a centre-pin, which is in the form of construction here represented, serves the two-fold purpose of a means by which to turn the spring to the adjustment required, and also to hold the parts of the hinge together. Another pin is also shown in connection with it in the same figure, which latter pin is intended to secure the spring in adjustment.

Figure 7 is a perspective view of a nut, intended to be screwed upon the lower end of the centre-pin, to secure the parts of the hinge together.

Figures 8, 9, 10, 11, and 12, show different forms of construction of springs for the said hinge.

Figure 13 is a view, slightly in perspective, of a key, intended to be used in adjusting the spring, that it may have the requisite force for operating the door, &c.

*General Description.*

A is one of the leaves or wings of the hinge. This wing has cast or made with it the lower part *a* of the knuckle or joint of the hinge, which is made hollow to admit the spring which furnishes the power to open or shut the door, or other article to which the hinge may be attached. B is the other wing or leaf of the hinge, with the upper part *b* of the knuckle or joint, which part, *b*, is also made hollow for the admission of the spring. The lower end of the part *a* is formed with a recess or cup, as shown at *a'*, in figs. 4 and 5, to receive the upper end of the lower half of the knuckle or joint of the hinge, which latter is formed with a plug or reduced end at *b'* to fit it, as shown in figs. 2 and 4, in such a manner as to form a joint with the other part of the knuckle of the hinge. C is a centre-pin, designed to secure the parts A and B to each other, and also to furnish a part of the appliance for adjusting the tension or torsion of the spring to adapt it to the work required. This centre-pin C is provided with a screw-thread at the lower end, on to which the nut D fits to draw and hold the parts A and B of the hinge together. Most of the length of the centre-pin C may be made round, but near the top it is provided with a square section, *c*, which fits into the cap E attached to the top of the spring, which cap has a square hole to receive the said part *c* of the centre-pin. Said centre-pin C is also provided with a round boss or shoulder, *d*, which latter has a hole bored through it to receive the adjusting-pin F, and this boss or shoulder

*d* is surmounted by a head, *e*, to receive the key for the purpose of adjusting the torsion or tension of the spring. A series of holes, *f*, is made in the upper part of the knuckle or joint of the hinge, arranged in a line concentric with the axis of the hinge and immediately under the boss or shoulder *d*, as shown at *g* in fig. 3, for the adjusting-pin F to enter when the spring is adjusted. H H are different forms of springs, to be used to give the necessary power to open or close the door or other article to which the hinge may be attached. Each of these springs is attached at the top to a cap, E, and at the lower end to a base-plate, I, which latter has a small hole, *h*, in it to receive the pin or stud *i*, which projects upward from the end-plate *j* at the bottom of the cavity or hollow made in the joint of the hinge to receive the spring. In figs. 8 and 9 are represented different forms of springs which may be used for this purpose; in fig. 10 said spring is represented as being a single wire, coiled into a spiral form; in fig. 11 said spring is represented as being made of four wires coiled into a spiral form, and in fig. 12 said spring is represented as being composed of nine wires, first twisted into strands of three each, and then all twisted together into the form of a rope. A single coiled-wire spring being the simplest, may perhaps be preferred.

The parts of the hinge having been constructed, the spring is set into the lower part of the joint, the upper part of the joint brought to its place, and the centre-pin being put in and the parts drawn together by the nut D, and the adjusting-pin F put in place, the hinge is complete and ready to be applied to the door or other thing to be hinged. This having been done, the torsion or tension of the spring may then be adjusted by means of the key J, which is so constructed for that purpose as to fit the head *e* of the centre-pin, and the spring is then secured in adjustment by inserting the adjusting-pin F through the boss *d* into one of the holes *g*, and this adjustment may be changed in the same manner, as experience may indicate, or the changes of the weather, or other circumstances may require or render desirable.

It is entirely obvious that the forms of construction of this hinge may be modified in various ways without departing from the invention herein set forth. The springs may be made of any desirable form or material that will accomplish the purpose, though tempered steel wire, coiled into a spiral or helical form, may perhaps be the best. The joint of the hinge may be modified and put together in various ways, so long as it is provided with a cavity for the spring.

What I claim as the improvements of said SMITH, and for which I desire to secure Letters Patent, is—

1. The construction of a hinge with a tubular joint, having a torsion-spring therein, and with devices for adjusting and retaining said torsion, substantially as and for the purpose described.

2. The combination of the centre-pin, screw-pin, headed or capped spring, and tubular hinge, constructed and arranged to operate as and for the purpose substantially as described.

CHAS. E. STANLEY.

Witnesses:

W. H. BURRIDGE,

FRANK S. ALDEN.